United States Patent [19]
Katohno et al.

[11] Patent Number: 5,170,304
[45] Date of Patent: Dec. 8, 1992

[54] DEVICE FOR CLEANING ROTARY MAGNETIC HEAD OF MAGNETIC RECORDING AND REPRODUCING DEVICE AND METHOD OF CONTROLLING SAME

[75] Inventors: Noboru Katohno, Mito; Hiroyoshi Matsumoto; Takeo Ohkouchi, both of Katsuta, all of Japan

[73] Assignee: Hitachi, Ltd., Tokyo, Japan

[21] Appl. No.: 596,400

[22] Filed: Oct. 12, 1990

[30] Foreign Application Priority Data

Oct. 20, 1989 [JP] Japan .................. 1-271588

[51] Int. Cl.⁵ .............................................. G11B 5/41
[52] U.S. Cl. .................................................. 360/128
[58] Field of Search ........................................ 360/128

[56] References Cited

U.S. PATENT DOCUMENTS

| | | | |
|---|---|---|---|
| 4,704,647 | 11/1987 | Hino | 360/128 |
| 4,761,700 | 8/1988 | Fritsch | 360/128 |
| 4,811,149 | 3/1989 | Clausen | 360/128 |

FOREIGN PATENT DOCUMENTS 0191317 8/1989 Japan .

Primary Examiner—David J. Severin
Attorney, Agent, or Firm—Antonelli, Terry, Stout & Kraus

[57] ABSTRACT

A cleaning device for cleaning a rotary magnetic head of a magnetic recording and reproducing device includes a cleaning member which is movable into and out of contact with the rotating magnetic head. The cleaning device is activated through the operation of a manually operable button and under the control of an electronic control device. The cleaning member is automatically brought into contact with the magnetic head to clean the same. The operation of the cleaning device is carried out in association with an operation of a tape loading mechanism of the magnetic recording and reproducing device. The vertical position of the cleaning member is changed when it is contacted with the magnetic head, so that the portion of the cleaning member to be contacted with the magnetic head is changed.

13 Claims, 8 Drawing Sheets

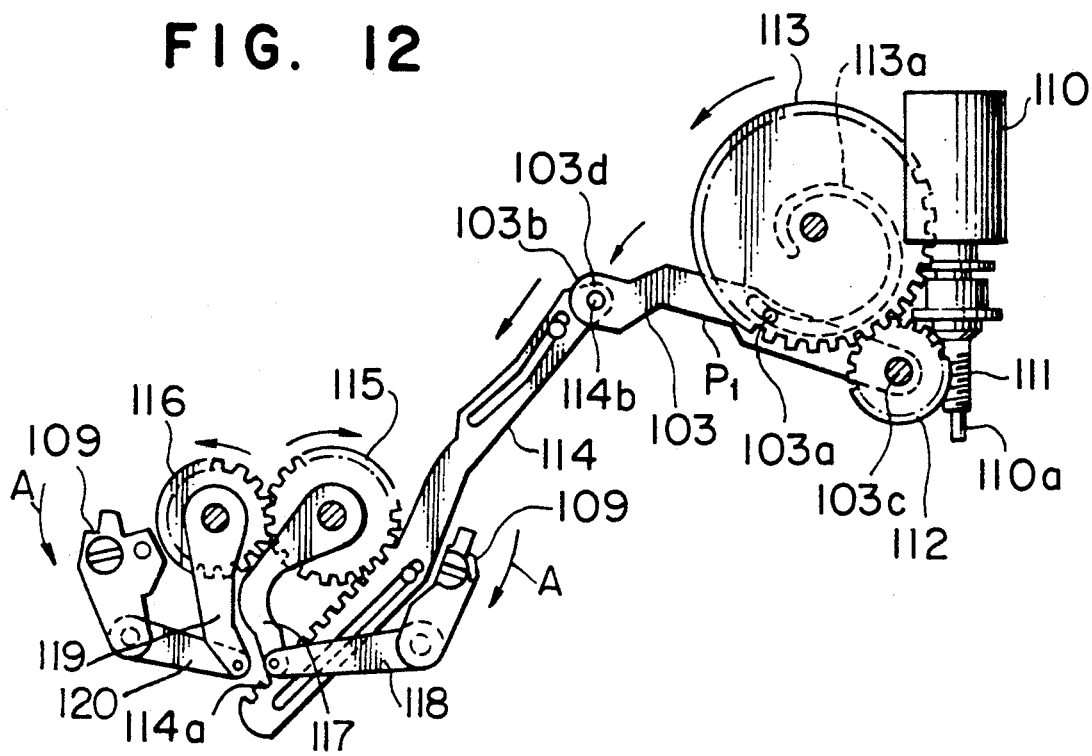
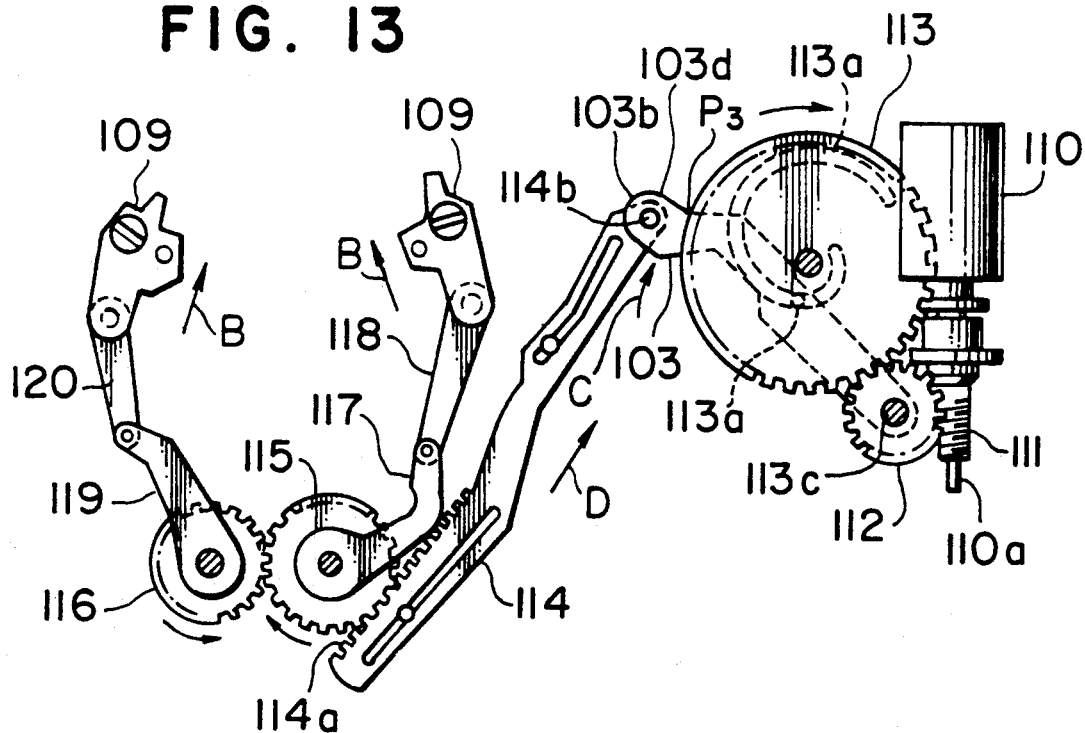

DEVICE FOR CLEANING ROTARY MAGNETIC HEAD OF MAGNETIC RECORDING AND REPRODUCING DEVICE AND METHOD OF CONTROLLING SAME

BACKGROUND OF THE INVENTION

This invention relates to a cleaning device for a magnetic recording and reproducing device of the rotary magnetic head-type and also to a method of controlling such a cleaning device. The cleaning device and its control method are suitably used for a magnetic head mounted on a rotary cylinder of a home video tape recorder (hereinafter referred to as "VTR"), although their application is not limited to such a magnetic head.

One conventional cleaning device of this type is disclosed, for example, in Japanese Laid-Open (Kokai) Patent Application No. 64-191317. This conventional cleaning device includes a cleaning brush for cleaning a rotary magnetic head. In order to enhance the cleaning efficiency, the axis of rotation of the cleaning brush is inclined with respect to a rotary cylinder in a peripheral direction of this cylinder.

As is well known, when foreign matter or dirt adheres to the surface of a rotary magnetic head of a magnetic recording and reproducing device, proper magnetic recording on a magnetic tape, as well as proper reproduction from the magnetic tape, can not be carried out. Particularly, in a home VTR, the rotary magnetic head is provided for recording video information on the magnetic tape and for reproducing the video information from the magnetic tape. Therefore, when foreign matter or dirt adheres to the surface of the rotary magnetic head, and particularly to its magnetic gap portion, a spacing loss develops between the magnetic head and the magnetic tape which results in failure to achieve normal recording and reproduction of the video information. More specifically, a beautiful picture is not available on a television screen, thus adversely affecting the commercial value.

In view of the above problems, the device of the above publication is intended to clean the rotary magnetic head more effectively. Conventional cleaning devices including the device of the above publication are designed to be automatically operated in accordance with the normal operation of the magnetic recording and reproducing device, regardless of the operator's intention.

SUMMARY OF THE INVENTION

It is an object of this invention to provide a method of controlling a cleaning device for a rotary magnetic head of a magnetic recording and reproducing device which method is easy and convenient for the operator.

Another object of the invention is to provide a cleaning device which is simple in construction and which can be used in performing the above control method.

A further object of the invention is to provide a control method by which the cleaning of the rotary magnetic head can be automatically carried out positively when the operator desires it, and also to provide a device for performing such a control method.

According to one aspect of the present invention, there is provided a method of controlling a cleaning device comprising a cleaning member movable into and out of contact with a rotary magnetic head of a magnetic recording and reproducing device, the method comprising the step of activating the cleaning device by a human-initiated operation so as to automatically contact, at least one time under an electronic control, the cleaning member with the magnetic head making rotation, thereby cleaning the magnetic head.

According to another aspect of the invention, there is provided a cleaning device for cleaning a rotary magnetic head of a magnetic recording and reproducing device, comprising: a cleaning member; means for moving the cleaning member into and out of contact with the rotary magnetic head; and electronic control means for being activated by a human-initiated operation to operate the moving means so as to automatically contact, at least once, the cleaning member with the rotating magnetic head.

In the method and the device according to the present invention, by a human-initiated operation (for example, by pressing a predetermined button), the cleaning device of the magnetic recording and reproducing device is automatically operated at least once, thereby positively removing dirt and dust from the rotary magnetic head. Further, the operation and handling are very easy.

Preferably, the cleaning device for the rotary magnetic head utilizes a tape loading mechanism, and is operated by the rotation of a loading motor of this mechanism. By pressing the predetermined button, the control of the tape loading motor is effected, and the tape loading mechanism is automatically operated a plurality of times. The term "tape loading mechanism" used in this specification means a mechanism for pulling out the magnetic tape from the cassette, bringing the magnetic tape into contact with the rotary cylinder, and returning the magnetic tape into the cassette.

Preferably, control of the rotation of the tape loading mechanism is effected in accordance with an instruction from a system control portion (comprising a microcomputer) contained in the magnetic recording and reproducing device. The cleaning member is pressed against the rotary magnetic head in associated relation to the moving the magnetic tape out of and into the cassette, and when these operations are completed, the cleaning member is moved away from the rotary magnetic head. In this case, the cleaning member is pressed against the magnetic head for about 1 to 2 seconds, and there is no risk of damaging the magnetic head. Therefore, even when the cleaning device is automatically operated a plurality of times, this will not lead to any malfunction. Further, the tape loading mechanism is used for operating the cleaning device, and therefore the accurate operation can be achieved at low cost.

BRIEF DESCRIPTION OF THE DRAWINGS

The drawings show a home VTR incorporating a cleaning device according to the present invention;

FIGS. 12 and 13 are views respectively showing a tape pull-out mechanism in its inoperative condition and in its operative condition.

DETAILED DESCRIPTION OF THE PREFERRED EMBODIMENT

A preferred embodiment of the present invention will now be described with reference to the drawings.

Although description of the invention will be made with reference to a cleaning device embodying the invention, features and advantages of a cleaning method will also become clear from the following description.

Figure 10:
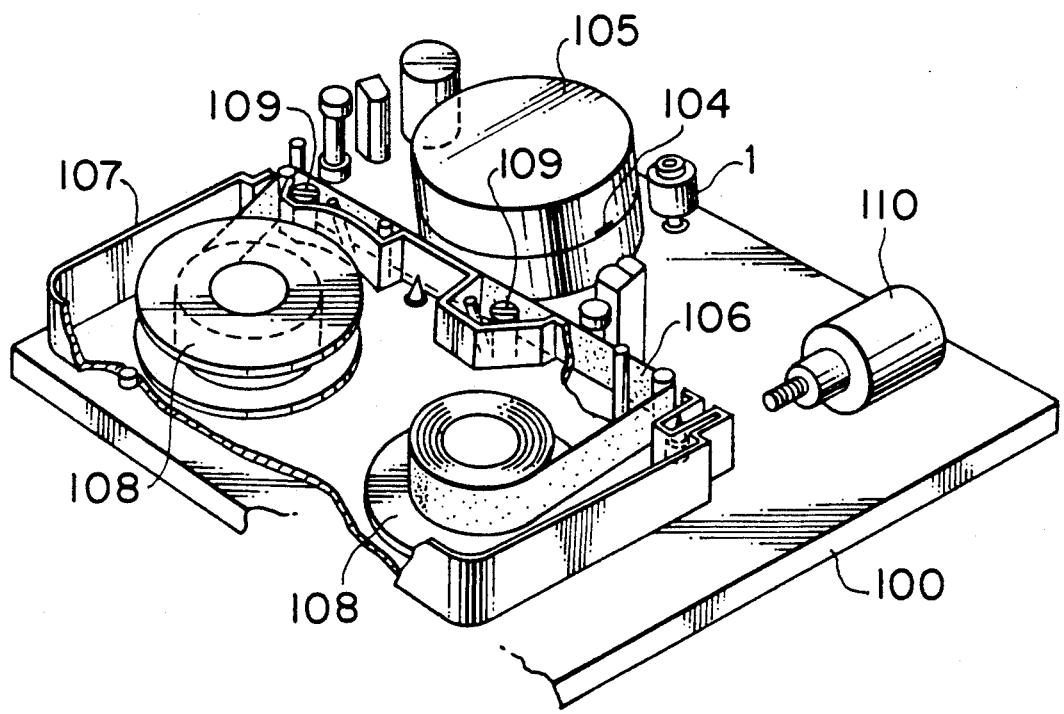
FIGS. 10 and 11 are views respectively showing a condition in which a tape cassette is set on the VTR and a condition in which the tape is pulled out of the cassette and is attached to a rotary cylinder.
Figure 11:
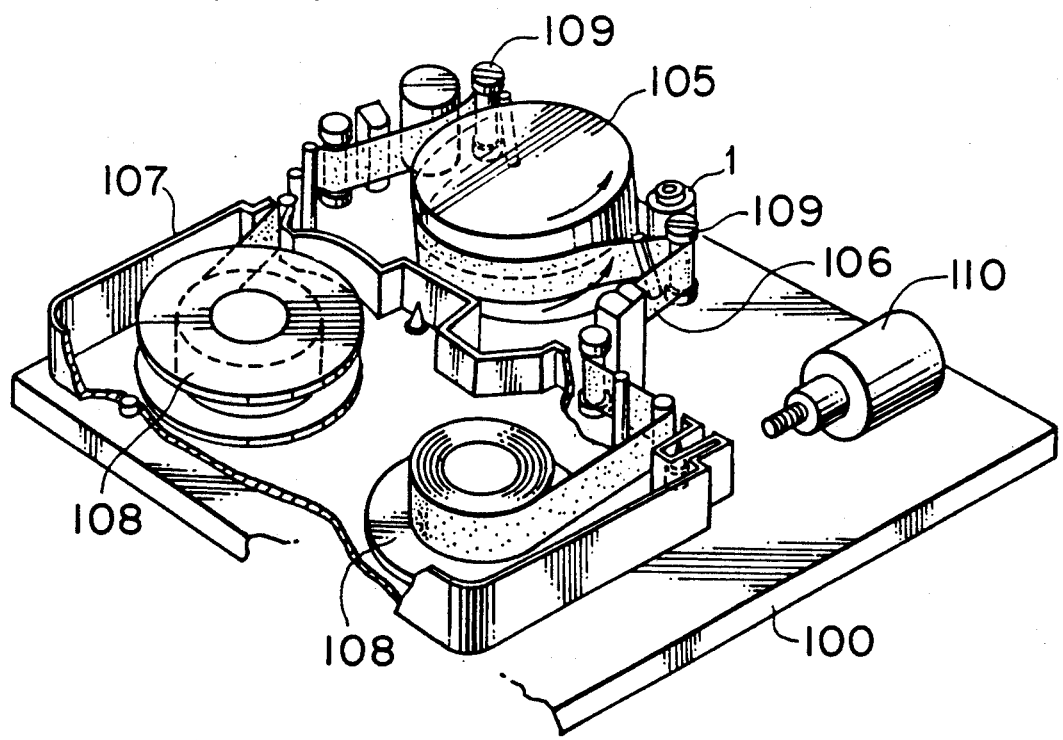

First, the mechanism of a home VTR incorporating a cleaning device of the invention will now be briefly described. This VTR uses a cassette of a conventional construction, and pulls a tape out of the cassette at the time of recording and reproduction. More specifically, as shown in FIG. 10, the tape 106 is wound on reels 108, and is housed in a cassette 107. In this VTR, when a video signal is to be recorded on and reproduced from the magnetic tape 106, the tape 106 is pulled out of the cassette 107 by tape pull-out members 109 and 109, and is brought into contact with the outer periphery of a rotary cylinder 105, as shown in FIG. 11. Then, when the cylinder 105 is rotated, the tape 106 is driven for movement, and magnetic recording and reproduction are carried out in a well known manner by a magnetic head 104 mounted on the cylinder 105.

The pull-out members 109 are operated in response to the rotation of a loading motor 110 via a drive mechanism. This drive mechanism is shown in FIGS. 12 and 13. A worm gear 111 is fixedly mounted on an output shaft 110a of the motor 110.

A worm wheel 112 in mesh with the worm gear 111, as well as a cam gear 113 in mesh with the worm wheel 112, are rotatably supported on a chassis 100 (FIG. 10). The cam gear 113 has a spiral cam groove 113a formed in its reverse surface, and a pin 103a is slidably received in the cam groove 113a. The pin 103a is mounted on a central portion of an elongated pull-out arm 103 in an upstanding manner, and a pivot hole 103c is formed through one end of the pull-out arm 103. The other end of the pull-out arm 103 is rounded to provide an arcuate portion 103b, and a rack engagement hole 103d is formed through this other end. The pull-out arm 103 is rotatably mounted on a rotatable shaft of the worm wheel 112 through the pivot hole 103c.

On the side of the free end of the pull-out arm 103, an elongated rack plate 114 is mounted on the chassis 100 so as to move in a longitudinal direction of the rack plate 114. A rack gear 114a is formed on one end portion of the rack plate 114, and a rack boss 114b is formed on the other end of the rack plate 114. The rack boss 114b is received in the rack engagement hole 103d of the pull-out arm 103 to pivotally interconnect the rack plate 114 and the pull-out arm 103.

The pair of pull-out members 109 and 109 are so mounted on the chassis 100 as to move along their respective paths. One of the two pull-out members 109 is connected to a drive gear 115 via a first arm 117 and a second arm 118. The drive gear 115 is rotatably supported on the chassis 100 and is in mesh with the rack gear 114a of the rack plate 114. The first arm 117 is fixedly secured at its one end to a rotatable shaft of the drive gear 115 so as to move the pull-out member 109 in the directions of arrows A and B in FIGS. 12 and 13 respectively in response to the rotation of the drive gear 115. Similarly, the other pull-out member 109 is connected to a drive gear 116 via first and second arms 119 and 120. The drive gear 116 is in mesh with the drive gear 115 so that the two pull-out members 109 can be moved in a symmetrical manner.

Next, the cleaning device or mechanism will now be described with reference to FIGS. 4 to 9. This mechanism comprises a cleaning member 1, a cleaning arm 3 supporting the cleaning member 1, a shift lever 2 for changing the position of contact of the cleaning member 1, and a cam roller 4.

Figure 5:
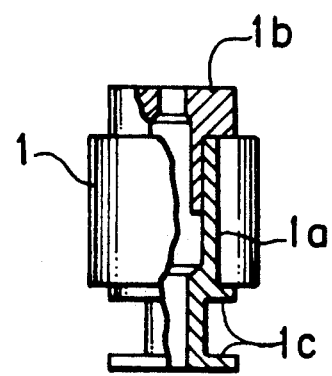
FIG. 5 is a cross-sectional view of a cleaning member of the cleaning device.

Referring to FIG. 5, the cleaning member 1, of a substantially cylindrical shape is fitted on a cylindrical shaft 1a and is fixed to the shaft 1a by a cap 1b press-fitted into the shaft 1a from an upper side. The shaft 1a has a flange portion 1c formed at a lower end portion thereof. The cleaning member 1 is rotatably supported by the elongated cleaning arm 3, and is disposed adjacent to the outer periphery of the rotary cylinder 105 at such a height that the cleaning member 1 can be brought into contact with the magnetic head 104.

The cleaning arm 3 has at its distal end an upstanding shaft 3a supporting the cleaning member 1, and a pivot hole 3c is formed through the other end of the cleaning arm 3. The cleaning arm 3 has a pair of bent portions intermediate the opposite ends thereof, and these bent portions extend upward in opposed relation to each other. Shift lever holes 3b and 3b (FIGS. 8 and 9) are formed through these bent portions, respectively. The shift lever 2 is disposed adjacent to the cleaning member 1 and is positioned above the cleaning arm 3.

The shirt lever 2 has an elongated shape, and is bifurcated at one side thereof. An operating projection 2a is laterally provided on the distal end of the shift lever 2 remote from the bifurcated portion. A pair of shift lever shafts 2b and 2b are laterally formed respectively on the opposed inner surfaces of the bifurcated portion and are disposed in registry with each other. A cam abutment portion 2c is formed on the distal end of one arm of the bifurcated portion of the lever 2. The shafts 2b and 2b are received respectively in the holes 3b and 3b, so that the shift lever 2 is supported on the cleaning arm 3 for swinging movement in a seesaw manner. In this condition, the operating projection 2a of the shift lever 2 is engaged with the flange portion 1c of the cleaning member 1. Spring 9 extends between the lever 2 and the cleaning arm 3 to pull the lever 2 so as to urge the cleaning member 1 upward through the operating projection 2c provided at the distal end of the lever 2.

An upstanding support post 101 (FIG. 4) is mounted on the chassis 100 and is disposed adjacent to the free end of the pull-out arm 103. The cleaning arm 3 supporting the cleaning member 1 and the shift lever 2, as well as a drive lever 6 (later described), is mounted on the support post 101. The support post 101 extends through the pivot hole 3c of the cleaning arm 3, so that the cleaning arm 3 is pivotally mounted on the support post 101. The cam roller 4 is mounted on the chassis 100, and is disposed at such a position as to be abuttable against the cam abutment portion 2c of the shift lever 2 above the cleaning arm 3 (In this embodiment, the cam roller 4 is disposed below the cam abutment portion 2c). The cam roller 4 is mounted, together with a coil member 7, on an upstanding roller shaft 102 mounted on the chassis 100.

Figure 8:
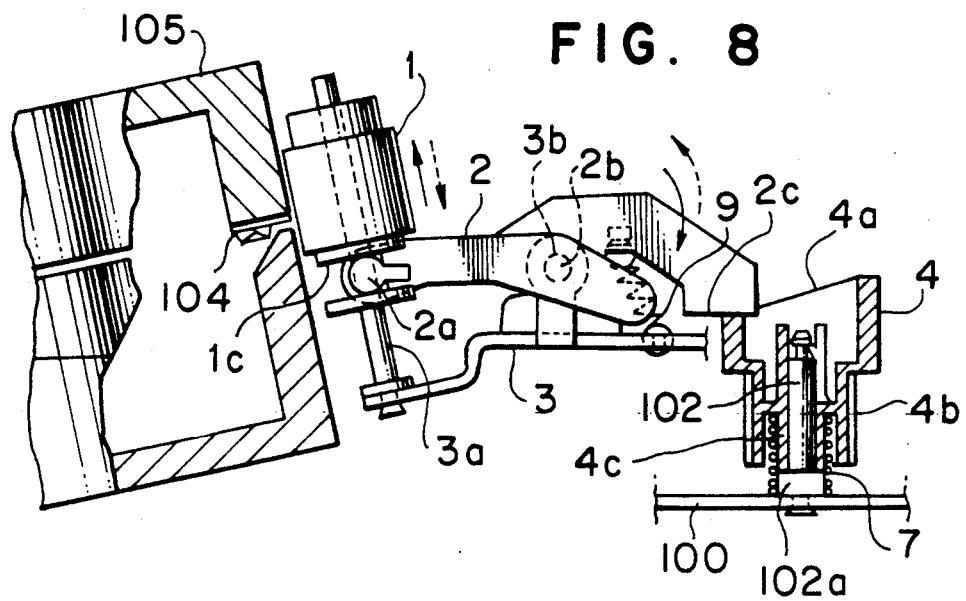
FIG. 8 is a side-elevational view of an important portion of the cleaning device in its operative condition.
Figure 9:
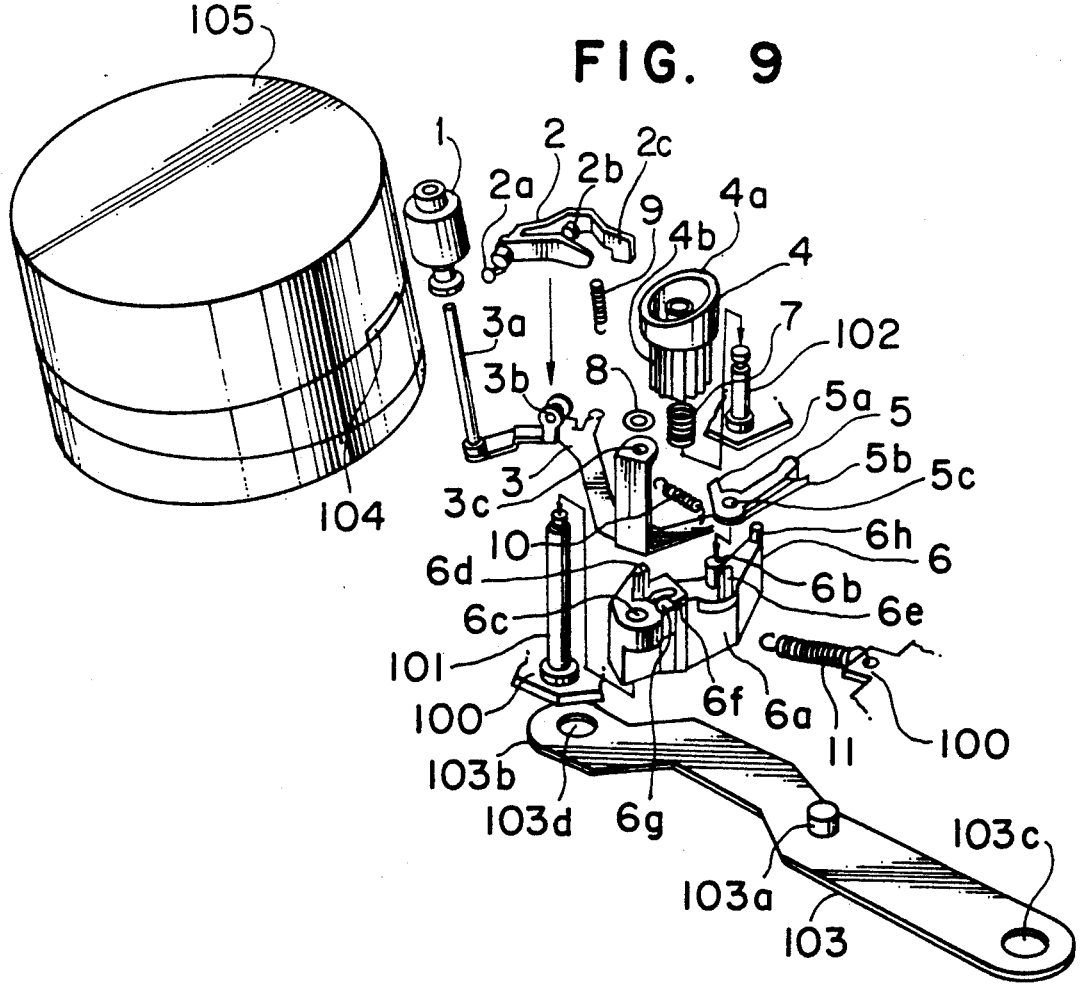
FIG. 9 is an exploded perspective view of the cleaning device.

As shown in FIGS. 8 and 9, the cam roller 4 has a substantially cylindrical shape, and its upper end is inclined to provide an end-face cam portion 4a. A serrated portion 4b is formed on the outer periphery of the cam roller 4, and a tubular stem portion 4c is formed at the lower portion of the roller 4.

The coil member 7 is formed by spirally winding a resilient material, such as a stainless steel wire, into a cylindrical shape. The coil member 7 is mounted on the tubular stem portion 4c of the cam roller 4 and a seat portion 102a of the shaft 102. The inner diameter of the coil member 7 is slightly smaller than the outer diameter of the tubular stem portion 4c of the cam roller 4 and the outer diameter of the seat portion 102a of the shaft 102. Therefore, the coil member 7 constitutes a one-way clutch mechanism utilizing a known coil spring, in which the coil member 7 in its mounted condition tightens the tubular stem portion 4c and the seat portion 102a to hold the cam roller 4 relative to the shaft 102, and the coil member 7, when receiving a force to loosen it, releases the cam roller 4. Namely, if the direction of turn of the coil member 7 is right, there is obtained a unidirectional rotation mechanism which allows the cam roller 4 to rotate in a direction of arrow R in FIG. 4 (i.e., in a clockwise direction), but prevents the cam roller 4 from rotating in a counterclockwise direction.

The drive lever 6 disposed below the cleaning arm 3 has a pivot hole 6c at one end thereof, and is rotatably mounted on the support post 101 through the pivot hole 6c. The drive lever 6 is a thick member, and it has a cam portion 6a at its side surface intermediate opposite ends thereof. The arcuate portion 103b at the distal end of the pull-out arm 103 is in contact with the cam portion 6a so as to operate the drive lever 6. A projection 6h is formed on the upper surface of the lever 6 at its free end, and a boss 6b and a retainer pawl 6e are formed on the upper surface of the lever 6 in slightly spaced relation to the free end thereof. A hook portion 6d is formed on the upper surface of the lever 6 generally at a central portion of the lever 6 in its longitudinal direction, and a projection 6g is formed on the upper surface of the lever 6 and is disposed near the pivot hole 6c. A hook portion 6f is formed on the side surface of the lever 6 and disposed near the hook portion 6d. A ratchet lever 5 is mounted on the drive lever 6.

Figure 4:
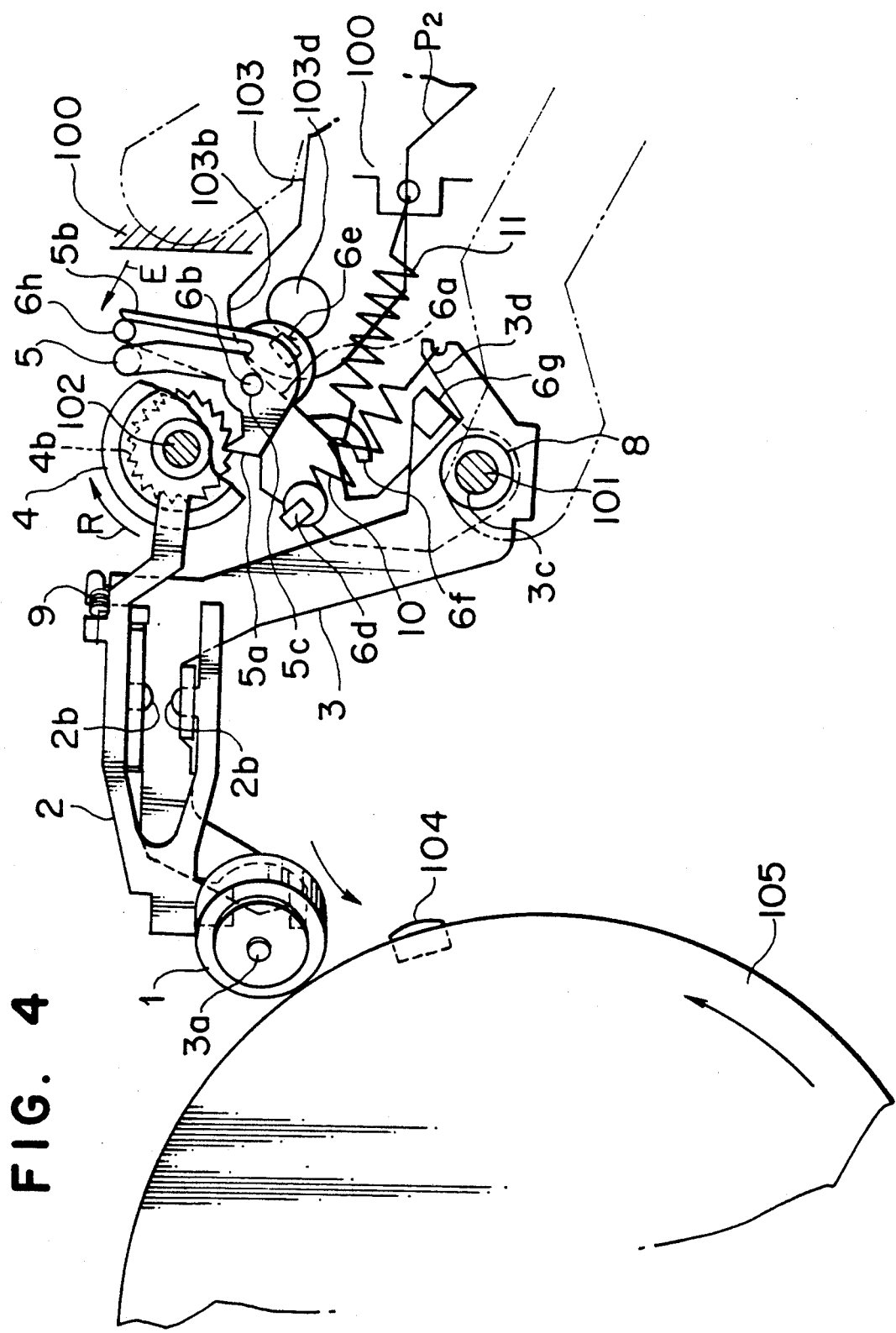
FIG. 4 is a plan view of an important portion of the cleaning device.

The ratchet lever 5 is of a reversed L-shape, and has a pawl 5a at one end thereof, and also has at the other end an integral resilient arm 5b for urging the lever 5. A pivot hole 5c is formed through the central portion of the lever 5, and the boss 6b of the drive lever 6 is fitted in the pivot hole 5c of the ratchet lever 5, so that the ratchet lever 5 is pivotally mounted on the drive lever 6. In this condition, the retainer pawl 6e of the drive lever 6 is engaged with the ratchet lever 5 to prevent the ratchet lever 5 from being disengaged from the drive lever 6. In this mounted condition, the resilient arm 5b of the ratchet lever 5 abuts against the projection 6h of the drive lever 6 as shown in FIG. 4, and when the lever 5 is moved in a counterclockwise direction (FIG. 4), the resilient arm 5b applies a clockwise rotating force to the lever 5.

Springs 10 and 11 are further mounted on the cleaning mechanism of the above construction to apply rotating forces to the levers. More specifically, the spring 11 extends between the hook portion 6f of the drive lever 6 and the chassis 100 to apply a clockwise rotating force to the drive lever 6. The spring 10 extends between the hook portion 6d of the drive lever 6 and a retainer portion 3d of the cleaning arm 3 to interconnect the drive lever 6 and the cleaning arm 3, thereby applying a counterclockwise rotating force to the cleaning arm 3. However, the retainer portion 3d of the cleaning arm 3 is brought into abutment against the projection 6g of the drive lever 6, so that the counterclockwise rotation of the cleaning arm 3 is prevented.

Figure 2:
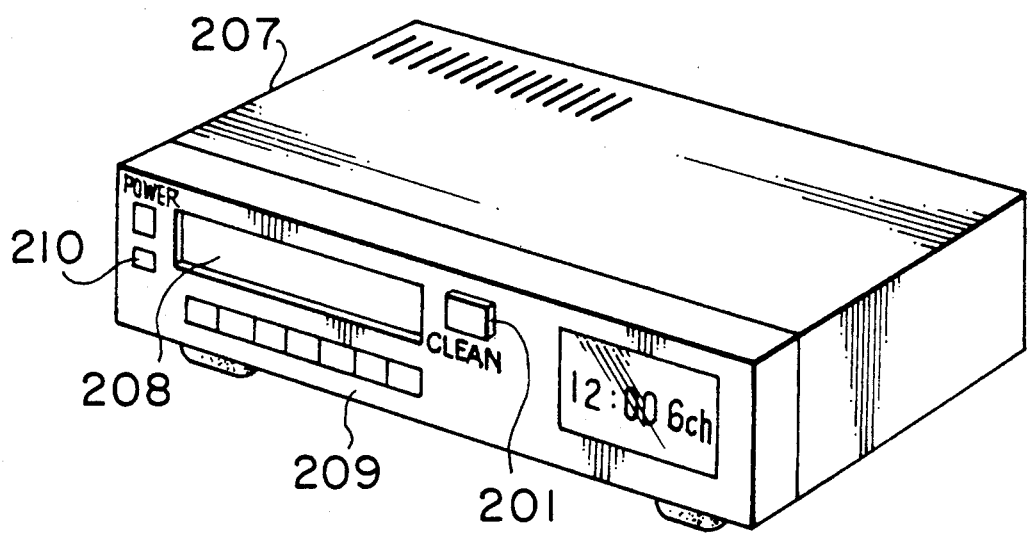
FIG. 2 is a perspective view showing the appearance of the VTR.

FIG. 2 shows the appearance of the above-mentioned VTR 207. A cassette insertion opening 208, a cleaning operation button 201, an optical remote control signal-receiving portion 210, and etc., are provided at a front operation panel 209 of the VTR 207.

Figure 1:
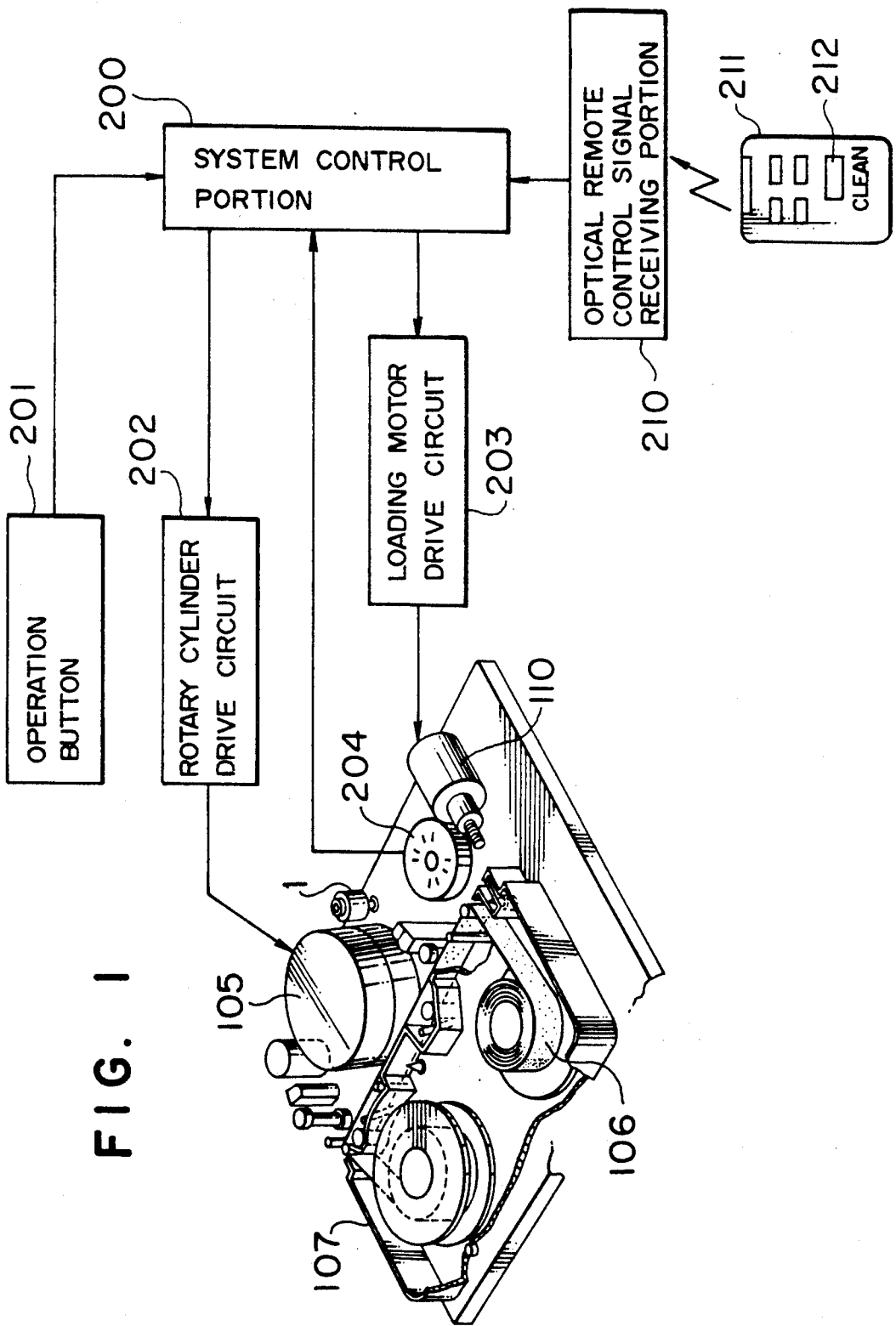
FIG. 1 is a block diagram of a control system of the cleaning device.

Control of the cleaning mechanism is carried out by a control system shown in FIG. 1. The control system comprises a system control portion 200, the operation button 201, a rotary cylinder drive circuit 202, a detection switch 204, a loading motor drive circuit 203, and the optical remote control signal-receiving portion 210. These parts 201, 202, 204, 203 and 210 are electrically connected to the system control portion 200. The system control portion 200 comprises a microcomputer, and performs the overall control of the system of the VTR, including the control of the cleaning mechanism. The rotary cylinder drive circuit 202 is responsive to an instruction from the system control portion 200 to drive the rotary cylinder 105 for rotation. The detection switch 204 detects the position of the element of the tape loading mechanism including the motor 110, and outputs a detection signal to the system control portion 200. In accordance with an instruction from the system control portion 200, the loading motor drive circuit 203 rotates the motor 110 in its normal or reverse direction, or stops the motor 110. The operation button 201 is connected to an electrical switch (not shown) or the like and inputs an electrical signal, produced upon pressing of this button, into the system control portion 200. The optical remote control signal-receiving portion 210 receives an operation signal from a remote control transmitter 211, converts this signal into an electrical signal, and then outputs this electrical signal into the system control portion 200.

The operation of the above VTR 207 will now be described. When the magnetic tape 106 is to be pulled out of the cassette 107 so as to be attached to the rotary cylinder 105, the worm gear 110, the worm wheel 112 and the cam gear 113 are rotated by the motor 110 as described above (FIGS. 12 and 13). At the same time, the cam groove 113a of the cam gear 113 is rotated to be displaced so as to angularly move the pull-out arm 103 in the direction of an arrow C in FIG. 13 (i.e., clockwise direction), thereby pulling the rack plate 114 in the direction of an arrow D.

This movement of the rack plate 114 causes the drive gears 115 and 116 to rotate, so that the pull-out members 109 and 109 are moved through the drive gears 115 and 116 and the first and second arms 117 to 120. As a result, the pull-out members 109 and 109 pull out the magnetic tape 106, and bring it into contact with the outer periphery of the rotary cylinder 105. Thereafter, a predetermined magnetic recording or reproduction is carried out by the rotary magnetic head 104. When the magnetic tape 106 is to be returned into (that is, contained in) the cassette 107, an operation reverse to the above operation is carried out. These operations are carried out under the control of the system shown in FIG. 1. In order that normal magnetic recording and reproduction can always be effected, foreign matter or dirt must not be present on the surface of the rotary magnetic head 104 and particularly near the magnetic gap.

Figure 6:
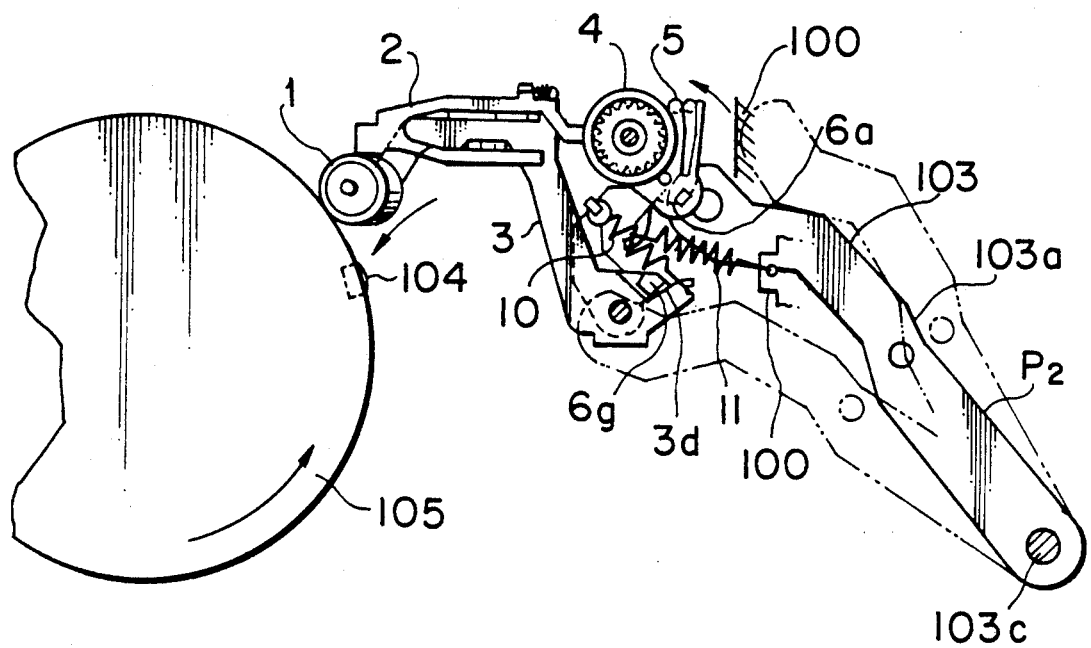
FIG. 6 is a plan view of the portion of the cleaning device depicted in FIG. 4 showing the portion in its operative condition.
Figure 7:
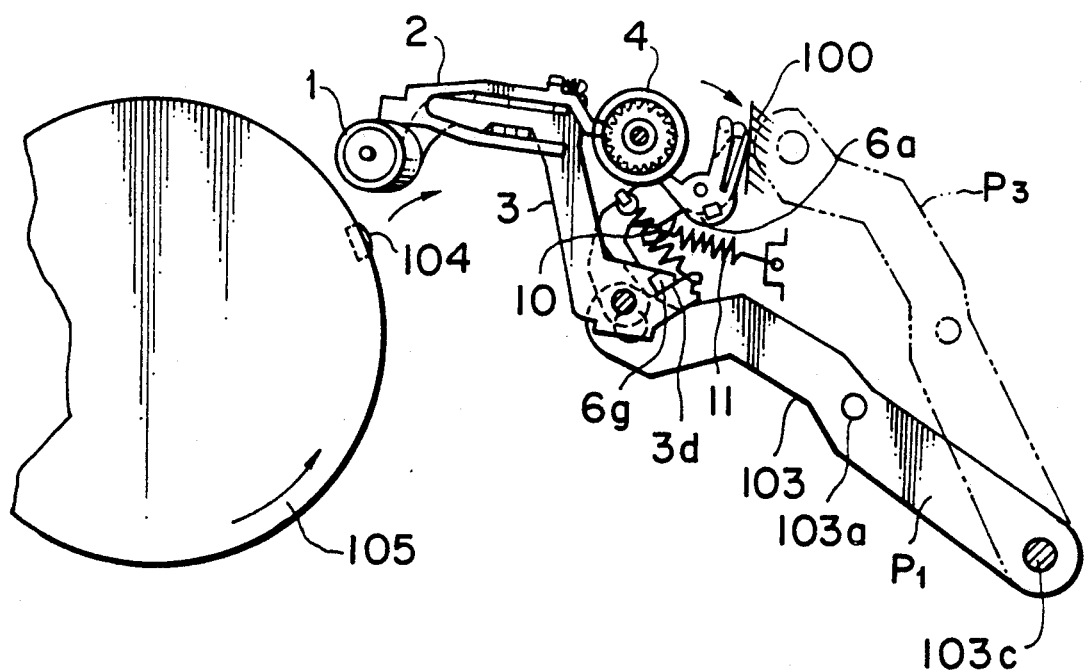
FIG. 7 is a plan view of an important portion of the cleaning device depicted in FIG. 4 showing the portion in its inoperative condition.

The cleaning mechanism of this embodiment operates, making use of the movement of the pull-out arm 103 operated when pulling out and returning the magnetic tape 106. FIG. 6 shows an operative condition of the cleaning mechanism, and FIG. 7 shows an inoperative condition of the cleaning mechanism. FIG. 4 shows the condition of FIG. 6 in further detail. In these Figures, reference characters P1, P2 and P3 respectively designate the progressive positions of the pull-out arm 103 moved to pull out and return the magnetic tape 106. P1 represents the position when the magnetic tape 106 is contained in the cassette, and P3 represents the position when the magnetic tape 106 is pulled out, and P2 represents an intermediate position during the pulling-out or the returning of the magnetic tape 106.

The cleaning mechanism is normally in the inoperative condition shown in FIG. 7. In this condition, the drive lever 6 is urged in the clockwise direction by the spring 11 and is abutted against the end surface of the chassis 100 to remain stationary. At this time, the cleaning arm 3 is subjected to the counterclockwise rotating force applied by the spring 10, and the retainer portion 3d is abutted against the projection 6g of the drive lever 6 to remain stationary. Therefore, the cleaning roller 1 on the cleaning arm 3 is spaced from the rotary cylinder 105.

In the operative condition shown in FIGS. 4 and 6, the pull-out arm 103 is first moved to the vicinity of the position P2 during the pulling-out or the returning of the magnetic tape 106. At this time, the arcuate portion 103b at the distal end of the pull-out arm 103 is abutted against the cam portion 6a of the drive lever 6, so that the drive lever 6 is forcibly angularly moved counterclockwise through a predetermined angle against the bias of the spring 11. In accordance with this movement, the cleaning arm 3 is similarly moved angularly, and therefore the cleaning member 1 is brought into contact with the rotary cylinder 105 during the angular movement of the cleaning arm 3. As a result, the angular movement of the cleaning arm 3 is stopped, and the retainer portion 3d of the cleaning arm 3 moves away from the projection 6g of the drive lever 6, so that a greater counterclockwise rotating force from the spring 10 acts on the cleaning arm 3 and the cleaning member 1. Namely, by suitably determining the load of the spring 10, a suitable force of pressure contact of the cleaning member 1 with the rotary cylinder 105 can be obtained. When the cleaning member 1 is urged against the rotary cylinder 105, the rotary cylinder 105 is driven for rotation under the control of the drive circuit 202, so that the magnetic head 104 on the rotary cylinder 105 is cleaned.

As the pull-out arm 103 is abutted against the drive lever 6 and is moved in the direction of the arrow E (FIG. 4), the pawl 5a of the ratchet lever 5 on the drive lever 6 is engaged with the serrated portion 4b of the cam roller 4 to rotate this roller in the clockwise direction (i.e., in the direction of arrow R) through a predetermined angle. As described above, the cam roller 4 will not be rotated in the counterclockwise direction due to the action of the one-way clutch coil member 7 mounted on the lower portion of the cam roller 4. Therefore, each time the drive lever 6 is operated, the cam roller 4 is rotated in the direction of arrow R through the predetermined angle.

As shown in FIG. 8, in accordance with the rotation of the cam roller 4, the end-face cam portion 4a at the upper end of the cam roller 4 is moved, so that the cam abutment portion 2c of the shift lever 2, abutted against the cam portion 4a, is moved upward or downward. At the same time, the operating portion 2a at the distal end of the shift lever 2 is moved to move the cleaning member 1 upward or downward through the flange portion 1c. As a result, each time the drive lever 6 is operated, the position of the cleaning member 1 in the vertical direction is sequentially changed. Thus, the position of the cleaning member 1 pressed against the rotary magnetic head 104 can be changed in the vertical direction, and therefore the same portion of the cleaning member 1 is not exclusively used, thereby enabling a prolonged service life of the cleaning member 1.

As described above, the head cleaning mechanism of this embodiment is automatically operated by the rotation drive control of the motor 110 and rotary cylinder 105. Therefore, by activating this control through the human-initiated operation, the cleaning of the rotary magnetic head can be intentionally carried out when the operator desires such cleaning. In this embodiment, this activation is effected by operating the operation button 201 on the front operation panel or the remote control signal transmitter 211. Namely, when it is desired to operate the head cleaning mechanism, this can be done by merely pressing the operation button 201 or a button 212 of the transmitter 211.

Figure 3:
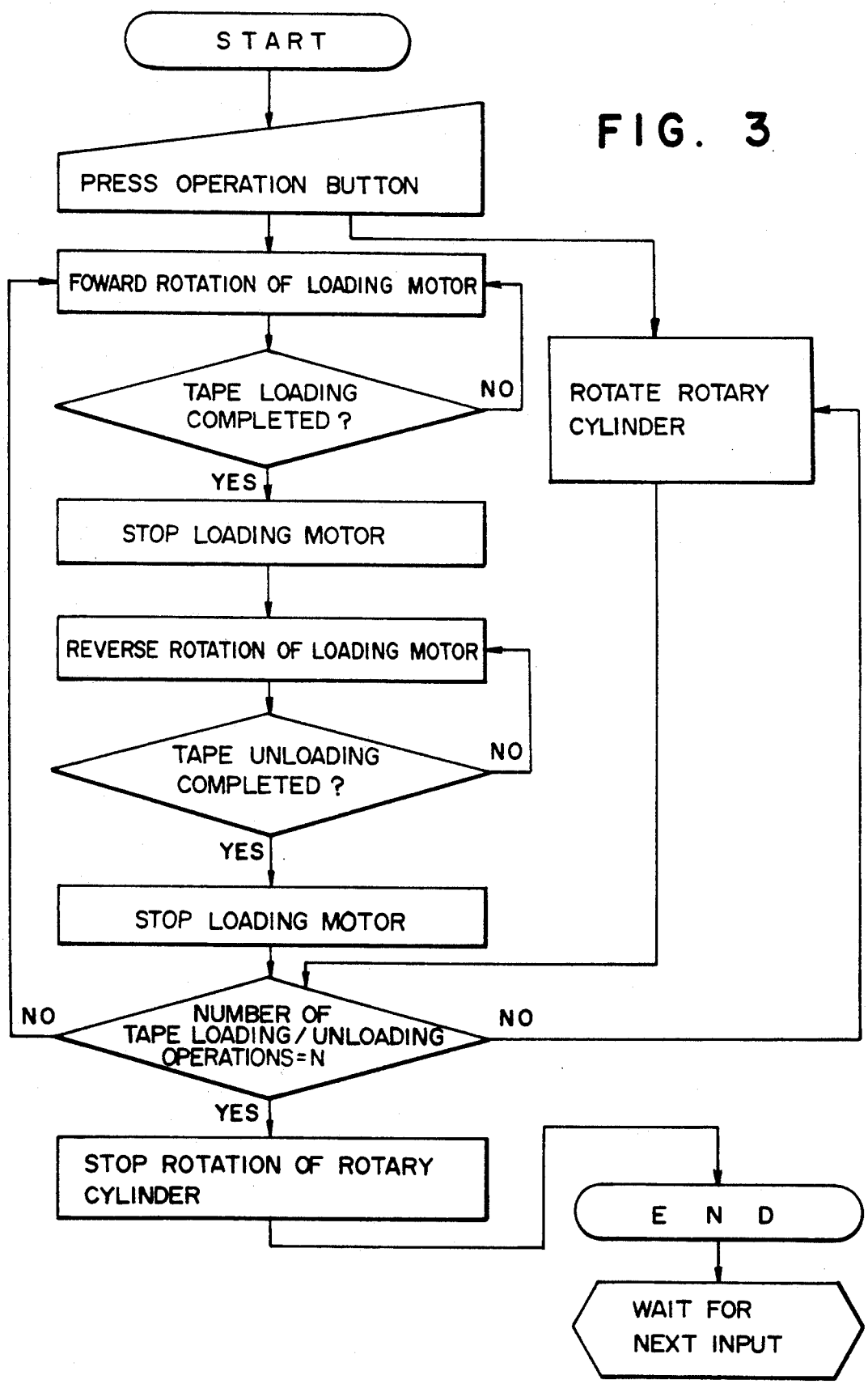
FIG. 3 is a flow chart of the operation of the control system.

The processing procedure for the above activation will now be described with reference to a flow chart of FIG. 3.

When the operation button 201 is pressed, this information is inputted into the system control portion 200. In the case where the transmitter 211 is used, a signal produced upon operation of the button 212 is similarly inputted into the system control portion 200 via the optical remote control signal-receiving portion 210. Then, a signal for rotating the motor 110 in its normal direction is fed from the system control portion 200 to the drive circuit 203. As a result, the motor 110 rotates in its normal direction to move the tape loading mechanism to pull the magnetic tape 106 out of the cassette 107. At the same time, the system control portion 200 feeds an instruction for rotating the rotary cylinder 105 to the rotary cylinder drive circuit 202, so that the rotary cylinder 105 is rotated. During the pulling-out of the magnetic tape 106, the cleaning member 1 is pressed against the rotary cylinder 105, and cleans the magnetic head 104, as described above.

Thereafter, the detection switch 204 detects the position of the element of the tape loading mechanism to feed a tape loading completion signal to the system control portion 200 whereupon an instruction for stopping the motor 110 is fed from the system control portion 200 to the drive circuit 203. As a result, the rotation of the motor 110 is stopped. When the motor 110 is stopped, the system control portion 200 feeds an instruction for rotating the motor 110 in its reverse direction to the drive circuit 203. Therefore, the motor 110 rotates in its reverse direction, so that the tape loading mechanism moves to return the magnetic tape into the cassette 107. During this movement, the cleaning member 1 is pressed against the rotary cylinder 105 to clean the rotary magnetic head 104.

Subsequently, when in accordance with the position of the element of the tape loading mechanism, the detection switch 204 feeds a tape unloading completion signal to the system control portion 200, an instruction for stopping the motor 110 is fed from the system control portion 200 to the drive circuit 203. As a result, the rotation of the motor 110 is stopped, and the step of cleaning the magnetic head is finished.

In this embodiment, the system control portion 200 is designed to continuously perform a predetermined number of the above cleaning step (that is, the tape loading and unloading operations of the tape loading mechanism). When the number of the cleaning step reaches the predetermined number (N), the operation of the tape loading mechanism is finished under the control of the system control portion 200, and the rotation of the rotary cylinder is also stopped.

In the above embodiment, although the loading of a tape cassette 107 is a requirement or condition for the drive control, the cleaning mechanism can be operated by operating the tape loading mechanism even when a cassette is not loaded. Such a modification can be easily done by suitably setting the system control portion.

Although the present invention has been described with respect to the above embodiment, the present invention is not to be restricted to such a specific form, and various modifications other than the above modification can be made. For example, the tape loading mechanism may be replaced by a special mechanism for activating the cleaning mechanism by a human-initiated operation.

What is claimed is:

1. A method of controlling a cleaning device provided in a magnetic recording and reproducing device including a rotary magnetic head for recording and reproducing signals on a magnetic tape, a tape loading-/unloading mechanism for positioning mechanism for positioning a magnetic tape from a tape cassette at the rotary magnetic head for recording or reproduction of magnetic signals on the magnetic tape, and a cleaning member movable into and out of contact with the rotary magnetic head, the method comprising the steps of:
(a) detecting a cleaning signal to clean the rotary magnetic head;
(b) changing the vertical position of the cleaning member with respect to the rotary magnetic head;
(c) driving the rotary magnetic head to rotate the magnetic head; and
(d) moving the cleaning member into contact with the magnetic head as the magnetic head is driven, thereby cleaning the rotary magnetic head.

2. A method according to claim 1, further comprising actuating an operation button on one of a body of the magnetic recording and reproducing device and a remote control device to generate the cleaning signal.

3. A method according to claim 1, in which step (c) comprises moving the cleaning member from a position out of contact with the rotary magnetic head to a position in contact with the rotary magnetic head, and after sufficient time for the cleaning member to effect cleaning of the rotary magnetic head moving the cleaning member from the position in contact with the rotary magnetic head to the position out of contact with the rotary magnetic head.

4. A method according to claim 3, further comprising repeating step (c) so that the cleaning member is moved into contact with the rotary magnetic head a plurality of times.

5. A magnetic head cleaning device for incorporation into a magnetic recording the reproducing device having a rotary magnetic head, means for driving the rotary magnetic head to rotate the magnetic head, and a tape loading/unloading mechanism for positioning a magnetic tape from a tape cassette at the rotary magnetic head for recording or reproduction of magnetic signals on the magnetic tape, said cleaning device comprising:
a cleaning member;
first means responsive to operation of the tape loading/unloading mechanism for changing the vertical position of the cleaning member with respect to the rotary magnetic head; and
second means responsive to operation of the tape loading/unloading mechanism for moving the cleaning member into contact with the rotary magnetic head as the magnetic head is driven, to clean the rotary magnetic head.

6. A cleaning device according to claim 5, further comprising a first operation button provided on the magnetic recording and reproducing device, and a remote control device having a second operation button thereon, said operation buttons operative to initiate operation of the cleaning device.

7. A cleaning device according to claim 5, further comprising an operation button provided on the magnetic recording and reproducing device for initiating operation of the cleaning device.

8. A cleaning device according to claim 5 further comprising a remote control device, and an operation button provided on the remote control device for initiating operation of the cleaning device.

9. A cleaning device according to claim 5, in which the second means moves the cleaning member from a position out of contact with the rotary magnetic head to a position in contact with the rotary magnetic head, and after sufficient time for the cleaning member to effect cleaning of the rotary magnetic head moves the cleaning member from the position in contact with the rotary magnetic head to the position out of contact with the rotary magnetic head.

10. A cleaning device according to claim 9, in which the second means further moves the cleaning member to the position in contact with the rotary magnetic head and after a sufficient time to effect further cleaning of the rotary magnetic head moves the cleaning member to the position out of contact with the rotary magnetic head so that cleaning of the rotary magnetic head is carried out a plurality of times.

11. A magnetic recording and reproducing device comprising:
a rotary magnetic head;
means for driving the rotating magnetic head to rotate the magnetic head;
a tape loading/unloading mechanism for positioning a magnetic tape from a cassette at the rotary magnetic head for recording or reproduction of magnetic signals on the magnetic tape;
a cleaning member;
first means responsive to operation of the tape loading/unloading mechanism for changing the vertical position of the cleaning member with respect to the rotary magnetic head;

second means responsive to operation of the tape loading/unloading mechanism for moving the cleaning member into contact with the rotary magnetic head as the magnetic head is driven, to clean the rotary magnetic head; and electronic control means for controlling operation of the cleaning member.

12. A cleaning device according to claim 11, in which the second means moves the cleaning member from a position out of contact with the rotary magnetic head to a position in contact with the rotary magnetic head, and after sufficient time for the cleaning member to effect cleaning of the rotary magnetic head moves the cleaning member form the position in contact with the rotary magnetic head to the position out of contact with the rotary magnetic head.

13. A cleaning device according to claim 12, in which the second means further moves the cleaning member to the position in contact with the rotary magnetic head and after a sufficient time to effect further cleaning of the rotary magnetic head moves the cleaning member to the position out of contact with the rotary magnetic head so that cleaning of the rotary magnetic head is carried out a plurality of times.

* * * * *